(12) United States Patent
Mimura et al.

(10) Patent No.: US 10,201,731 B2
(45) Date of Patent: *Feb. 12, 2019

(54) GOLF BALL

(71) Applicant: SUMITOMO RUBBER INDUSTRIES, LTD., Kobe-shi (JP)

(72) Inventors: Kohei Mimura, Kobe (JP); Toshiyuki Tarao, Kobe (JP); Hidetaka Inoue, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,714

(22) Filed: Nov. 14, 2017

(65) Prior Publication Data

US 2018/0178072 A1 Jun. 28, 2018

(30) Foreign Application Priority Data

Dec. 22, 2016 (JP) ................................. 2016-248578

(51) Int. Cl.
*A63B 37/00* (2006.01)
*A63B 37/14* (2006.01)
(Continued)

(52) U.S. Cl.
CPC ...... *A63B 37/0022* (2013.01); *A63B 37/0012* (2013.01); *A63B 37/0031* (2013.01); *A63B 37/0033* (2013.01); *A63B 37/0043* (2013.01); *A63B 37/0045* (2013.01); *A63B 37/0064* (2013.01); *A63B 37/0074* (2013.01); *A63B 37/0075* (2013.01); *A63B 37/0086* (2013.01); *A63B 37/0096* (2013.01); *B32B 25/042* (2013.01); *B32B 25/14* (2013.01);
(Continued)

(58) Field of Classification Search
CPC ........................ A63B 37/0022; A63B 37/0003
See application file for complete search history.

(56) References Cited

U.S. PATENT DOCUMENTS 5,816,943 A * 10/1998 Masutani ........... A63B 37/0003
473/365
6,454,667 B1 * 9/2002 Iwami ................ A63B 37/0003
473/351
(Continued)

FOREIGN PATENT DOCUMENTS

JP    2000-288125 A    10/2000
JP    2010-188199 A    9/2010
(Continued)

*Primary Examiner* — John E Simms, Jr.
(74) *Attorney, Agent, or Firm* — Birch, Stewart, Kolasch & Birch, LLP

(57) ABSTRACT

A golf ball 2 includes a core 4, a cover 8 positioned outside the core 4, and a paint film 10 positioned outside the cover 8. The paint film 10 includes an inner layer 12 and an outer layer 14 positioned outside the inner layer 12. A 10% modulus Mo of the outer layer 14 is lower than a 10% modulus Mi of the inner layer 12. A difference (Mi-Mo) between the modulus Mi and the modulus Mo is not less than 25.0 kgf/cm². The cover 8 has a Shore D hardness Hc of not less than 50 and not greater than 65. The cover 8 has a thickness Tc of not less than 0.80 mm and not greater than 1.80 mm.

8 Claims, 1 Drawing Sheet

(51) Int. Cl.
  *C08J 7/04* (2006.01)
  *B32B 25/04* (2006.01)
  *B32B 25/14* (2006.01)
  *B29C 45/14* (2006.01)
  *B29K 9/00* (2006.01)
  *B29L 31/54* (2006.01)
  *B29K 75/00* (2006.01)
(52) U.S. Cl.
  CPC ......... *C08J 7/042* (2013.01); *B29C 45/14819* (2013.01); *B29K 2009/00* (2013.01); *B29K 2075/00* (2013.01); *B29K 2995/007* (2013.01); *B29K 2995/0082* (2013.01); *B29L 2031/546* (2013.01); *B32B 2307/536* (2013.01); *B32B 2307/546* (2013.01); *C08J 2309/00* (2013.01); *C08J 2323/08* (2013.01); *C08J 2353/00* (2013.01); *C08J 2475/08* (2013.01)

(56) References Cited

U.S. PATENT DOCUMENTS

| | | | |
|---|---|---|---|
| 2009/0105012 A1* | 4/2009 | Kamino | A63B 37/0003 473/377 |
| 2011/0098133 A1 | 4/2011 | Shiga et al. | |
| 2013/0203524 A1 | 8/2013 | Tarao et al. | |
| 2016/0136484 A1* | 5/2016 | Inoue | A63B 37/0022 473/377 |
| 2018/0036599 A1* | 2/2018 | Inoue | A63B 37/0012 |

FOREIGN PATENT DOCUMENTS

| | | |
|---|---|---|
| JP | 2011-92328 A | 5/2011 |
| JP | 2013-31778 A | 2/2013 |
| JP | 2013-176530 A | 9/2013 |

* cited by examiner

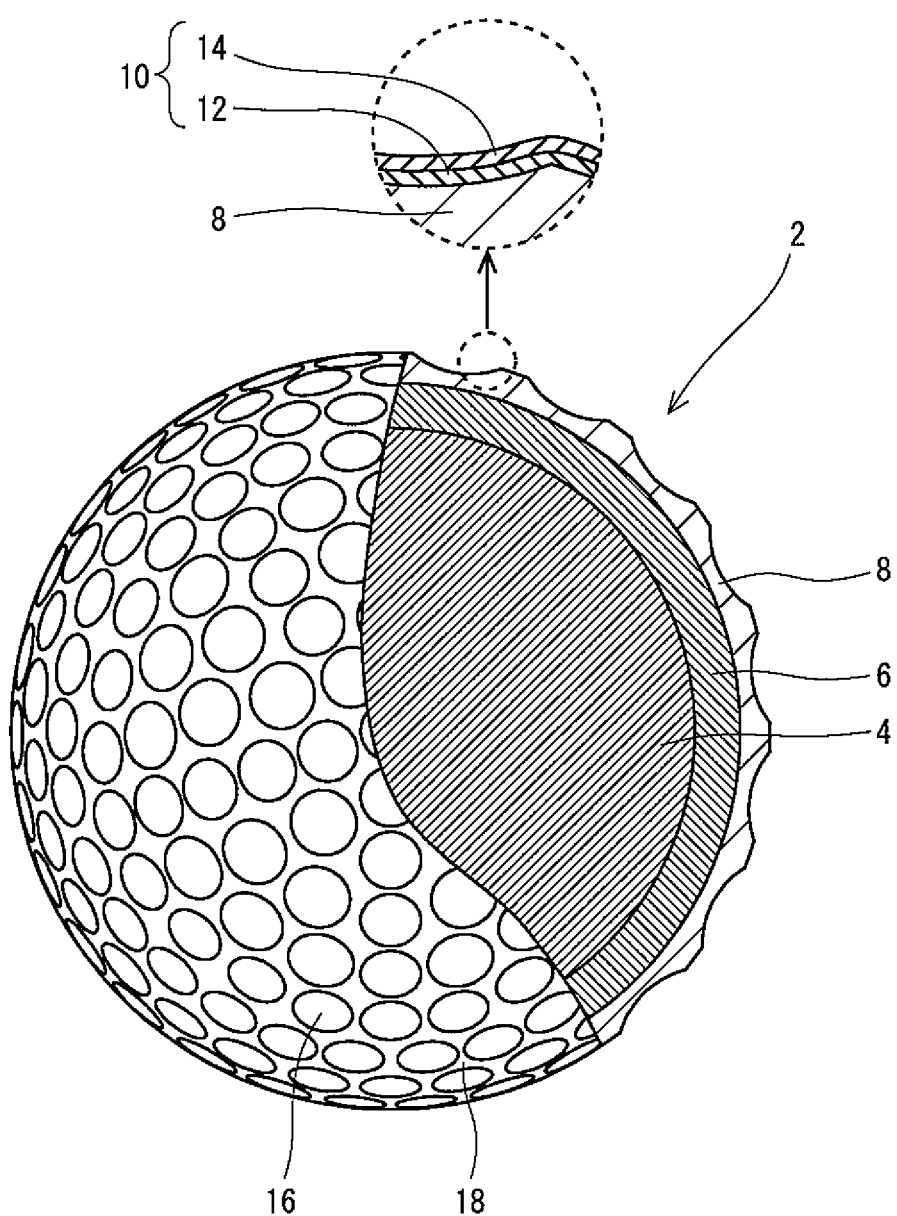

GOLF BALL

This application claims priority on Patent Application No. 2016-248578 filed in JAPAN on Dec. 22, 2016. The entire contents of this Japanese Patent Application are hereby incorporated by reference.

BACKGROUND OF THE INVENTION

Field of the Invention

The present invention relates to golf balls. Specifically, the present invention relates to golf balls having a paint film.

Description of the Related Art

Foremost requirement of gold players for golf balls is flight performance. Golf players particularly place importance on flight performance upon shots with drivers. Flight performance correlates with the resilience performance of golf balls. When a golf ball having excellent resilience performance is hit, the golf ball flies at a high speed, thereby achieving a large flight distance.

An appropriate trajectory height is required in order to achieve a large flight distance. A trajectory height depends on a spin rate and a launch angle. With a golf ball that achieves a high trajectory by a low spin rate and a high launch angle, a large flight distance is obtained.

Golf players also place importance on the controllability of golf balls. When a backspin rate is high, the run of the golf ball after landing is short. By using a golf ball having a high backspin rate, a golf player can cause the golf ball to stop at a target point. A golf ball to which backspin is easily provided has excellent controllability. Golf players particularly place importance on controllability upon approach shots.

In light of controllability upon an approach shot, the spin performance of golf balls is important.

Meanwhile, excessive spin impairs the flight performance of golf balls. In light of achieving both desired flight performance and desired controllability, golf balls having a multiplayer structure have been proposed. In JP2010-188199 and JP2013-31778, a golf ball including a core, a mid layer, and a cover is studied for the hardness and the thickness of each layer. JP2011-92328 (US2011/0098133 A1) discloses a golf ball including a cover formed from a resin composition containing a specific polyurethane.

JP2000-288125 (U.S. Pat. No. 6,454,667 B1) discloses a golf ball including a core, a cover, and a paint layer formed on the cover. In the golf ball, the resistance to burr and resistance to cutting are improved by adjusting the hardness and the flexural rigidity of the cover and the 10% modulus of the paint layer. In JP2013-176530
(US2013/0203524 A1), improving the spin rate and feel at impact upon an approach shot by adjusting the coefficient of friction of a paint film provided on the surface of a golf ball body is studied.

A golf club or a golf ball may get wet with rain or the like. A state where a golf club or a golf ball is wet is referred to as wet state. On the other hand, a state where a golf club or a golf ball is not wet is referred to as dry state. A flexible paint film can contribute to controllability in a dry state. However, according to the findings by the present inventor, the spin rate, in a wet state, of a golf ball having this paint film is not sufficient. Golf balls with which high spin rates are obtained upon approach shots in a dry state and in a wet state without impairing flight performance, are desired.

An object of the present invention is to provide a golf ball having excellent controllability upon approach shots in a dry state and in a wet state and further having excellent flight performance.

SUMMARY OF THE INVENTION

A golf ball according to the present invention includes a core, a cover positioned outside the core, and a paint film positioned outside the cover. The paint film includes an inner layer and an outer layer positioned outside the inner layer. A 10% modulus Mo of the outer layer is lower than a 10% modulus Mi of the inner layer. A difference (Mi-Mo) between the modulus Mi and the modulus Mo is not less than 25.0 kgf/cm$^2$. The cover has a Shore D hardness Hc of not less than 50 and not greater than 65. The cover has a thickness Tc of not less than 0.80 mm and not greater than 1.80 mm.

The golf ball according to the present invention has excellent controllability upon an approach shot in a dry state. The golf ball has excellent controllability upon an approach shot in a wet state. The golf ball further has excellent flight performance.

Preferably, the modulus Mi is not less than 100.0 kgf/cm$^2$. Preferably, the modulus Mo is less than 100.0 kgf/cm$^2$.

Preferably, the inner layer has a thickness Ti of not less than 5 μm and not greater than 30 μm. Preferably, the outer layer has a thickness To of not less than 5 μm and not greater than 30 μm.

Preferably, the golf ball further includes a mid layer between the core and the cover.

Preferably, the inner layer is formed from a resin composition. A base resin of the resin composition of the inner layer is a polyurethane. Preferably, the outer layer is formed from a resin composition. A base resin of the resin composition of the outer layer is a polyurethane. Preferably, the cover is formed from a resin composition. A principal component of a base resin of the resin composition of the cover is an ionomer resin.

BRIEF DESCRIPTION OF THE DRAWINGS

FIG. 1 is a cross-sectional view of a golf ball according to one embodiment of the present invention.

DESCRIPTION OF THE PREFERRED EMBODIMENTS

The following will describe in detail the present invention based on preferred embodiments with appropriate reference to the drawings.

A golf ball 2 shown in FIG. 1 includes a core 4, a mid layer 6 positioned outside the core 4, a cover 8 positioned outside the mid layer 6, and a paint film 10 positioned outside the cover 8. The paint film 10 includes an inner layer 12 positioned outside the cover 8 and an outer layer 14 positioned outside the inner layer 12. The golf ball 2 has a plurality of dimples 16 on the surface thereof. Of the surface of the golf ball 2, a part other than the dimples 16 is a land 18. The golf ball 2 may include a mark layer. The mark layer may be positioned between the cover 8 and the paint film 10, or may be positioned outside the paint film 10.

In another embodiment of the present invention, the paint film 10 may include three or more layers. In the case where the paint film 10 includes three or more layers, the layer that is closest to the cover 8 is referred to as innermost layer, and the layer that is furthest from the cover 8 is referred to as outermost layer. In the golf ball 2, the inner layer 12 is the innermost layer of the paint film 10, and the outer layer 14 is the outermost layer of the paint film 10.

The golf ball 2 preferably has a diameter of not less than 40 mm and not greater than 45 mm. From the viewpoint of conformity to the rules established by the United States Golf Association (USGA), the diameter is particularly preferably not less than 42.67 mm. In light of suppression of air resistance, the diameter is more preferably not greater than 44 mm and particularly preferably not greater than 42.80 mm. The golf ball 2 preferably has a weight of not less than 40 g and not greater than 50 g. In light of attainment of great inertia, the weight is more preferably not less than 44 g and particularly preferably not less than 45.00 g. From the viewpoint of conformity to the rules established by the USGA, the weight is particularly preferably not greater than 45.93 g.

The core 4 is formed by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferable. When a polybutadiene and another rubber are used in combination, it is preferred if the polybutadiene is the principal component. Specifically, the proportion of the polybutadiene to the entire base rubber is preferably not less than 50% by weight and particularly preferably not less than 80% by weight. The proportion of cis-1,4 bonds in the polybutadiene is preferably not less than 40% by weight, more preferably not less than 70% by weight, and particularly preferably not less than 90% by weight.

The rubber composition of the core 4 preferably includes a co-crosslinking agent. Preferable co-crosslinking agents in light of resilience performance of the golf ball 2 are monovalent or bivalent metal salts of an α,β-unsaturated carboxylic acid having 3 to 8 carbon atoms. Examples of preferable co-crosslinking agents include zinc acrylate, magnesium acrylate, zinc methacrylate, and magnesium methacrylate. In light of resilience performance of the golf ball 2, zinc acrylate and zinc methacrylate are particularly preferable.

The rubber composition may include a metal compound and an α,β-unsaturated carboxylic acid having 3 to 8 carbon atoms. They both react with each other in the rubber composition to obtain a salt. The salt serves as a co-crosslinking agent. Examples of preferable α,β-unsaturated carboxylic acids include acrylic acid and methacrylic acid. Examples of preferable metal compounds include zinc oxide and magnesium oxide.

In light of resilience performance, the amount of the co-crosslinking agent per 100 parts by weight of the base rubber is preferably not less than 20 parts by weight, more preferably not less than 25 parts by weight, and particularly preferably not less than 30 parts by weight. In light of spin performance and feel at impact, the amount of the co-crosslinking agent per 100 parts by weight of the base rubber is preferably not greater than 50 parts by weight, more preferably not greater than 45 parts by weight, and particularly preferably not greater than 40 parts by weight.

Preferably, the rubber composition of the core 4 includes an organic peroxide. The organic peroxide serves as a crosslinking initiator. The organic peroxide contributes to the resilience performance of the golf ball 2. Examples of suitable organic peroxides include dicumyl peroxide, 1, 1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

In light of resilience performance, the amount of the organic peroxide per 100 parts by weight of the base rubber is preferably not less than 0.2 parts by weight and more preferably not less than 0.3 parts by weight. In light of controllability and feel at impact, the amount of the organic peroxide per 100 parts by weight of the base rubber is preferably not greater than 3.0 parts by weight, more preferably not greater than 2.5 parts by weight, and particularly preferably not greater than 2.0 parts by weight.

The rubber composition of the core 4 can include an organic sulfur compound. Organic sulfur compounds include naphthalenethiol compounds, benzenethiol compounds, and disulfide compounds.

Examples of naphthalenethiol compounds include 1-naphthalenethiol, 2-naphthalenethiol, 4-chloro-1-naphthalenethiol, 4-bromo-1-naphthalenethiol, 1-chloro-2-napthtalenethiol, 1-bromo-2-naphthalenethiol, 1-fluoro-2-naphthalenethiol, 1-cyano-2-naphthalenethiol, and 1-acetyl-2-naphthalenethiol.

Examples of benzenethiol compounds include benzenethiol, 4-chlorobenzenethiol, 3-chlorobenzenethiol, 4-bromobenzenethiol, 3-bromobenzenethiol, 4-fluorobenzenethiol, 4- iodobenzenethiol, 2,5-dichlorobenzenethiol, 3,5-dichlorobenzenethiol, 2,6-dichlorobenzenethiol, 2,5-dibromobenzenethiol, 3,5-diromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, and 2-nitrobenzenethiol.

Examples of disulfide compounds include diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

In light of resilience performance of the golf ball 2, the amount of the organic sulfur compound per 100 parts by weight of the base rubber is preferably not less than 0.1 parts by weight and particularly preferably not less than 0.3 parts by weight. In light of spin performance and feel at impact, the amount of the organic sulfur compound per 100 parts by weight of the base rubber is preferably not greater than 5.0 parts by weight and more preferably not greater than 3.0 parts by weight. Two or more organic sulfur compounds may be used in combination.

The rubber composition of the core 4 may include a carboxylic acid and/or a metal salt thereof in addition to the aforementioned co-crosslinking agent. A carboxylic acid including a carboxylic acid component having 1 to 30 carbon atoms and/or a metal salt thereof is preferable. Examples of preferable carboxylic acids include: saturated fatty acids such as octanoic acid, lauric acid, myristic acid, stearic acid, and the like; unsaturated fatty acids such as 10-undecylenic acid, myristoleic acid, palmitoleic acid, oleic acid, linolic acid, and the like; aromatic carboxylic acids such as benzoic acid, phthalic acid, salicylic acid, and the like; and the like. Examples of the metal component forming the carboxylic acid metal salt include magnesium, calcium, zinc, barium, and the like.

In the case where a carboxylic acid and/or a metal salt thereof is included, in light of spin suppression, the amount of the carboxylic acid and/or the metal salt thereof per 100 parts by weight of the base rubber is preferably not less than 1.0 parts by weight and more preferably not less than 2.0 parts by weight. In light of controllability, the amount of the carboxylic acid and/or the metal salt thereof per 100 parts by weight of the base rubber is preferably not greater than 40 parts by weight and more preferably not greater than 30 parts by weight. Two or more carboxylic acids and/or metal salts thereof may be used in combination.

The rubber composition of the core 4 may include a filler for the purpose of specific gravity adjustment and the like. Examples of suitable fillers include zinc oxide, barium sulfate, calcium carbonate, and magnesium carbonate. The amount of the filler is determined as appropriate so that the intended specific gravity of the core 4 is accomplished.

The rubber composition of the core 4 may include various additives, such as sulfur, an anti-aging agent, a coloring agent, a plasticizer, a dispersant, and the like, in an adequate amount. The rubber composition may include crosslinked rubber powder or synthetic resin powder.

The core 4 has a weight of preferably not less than 10 g and not greater than 42 g. The temperature for crosslinking the core 4 is not lower that 130° C. and not higher than 200° C. The time for crosslinking the core 4 is not shorter than 10 minutes and not longer than 60 minutes. The core 4 may be crosslinked by two-stage heating. In the case of two-stage heating, the core 4 is preferably heated at a temperature of not lower that 130° C. and not higher than 150° C. for 20 to 40 minutes at the first stage and heated at a temperature of not lower that 160° C. and not higher than 180° C. for 5 to 15 minutes at the second stage.

In light of resilience performance, the core 4 has a diameter of preferably not less than 35.0 mm, more preferably not less than 36.0 mm, and further preferably not less than 38.0 mm. In light of spin performance and durability, the diameter of the core 4 is preferably not greater than 42.0 mm and particularly preferably not greater than 41.5 mm. The core 4 may have two or more layers. The core 4 may have a rib on the surface thereof. The core 4 may be hollow.

In the golf ball 2, the mid layer 6 is formed outside the core 4. The mid layer 6 may include two or more layers. Another layer may be further provided between the mid layer 6 and the core 4. In the present invention, an embodiment in which the golf ball 2 does not include the mid layer 6 is also possible.

The mid layer 6 is formed from a resin composition. A resin composition described later for the cover 8 can be suitably used. Preferably, the base resin of the resin composition is an ionomer resin. Examples of preferable ionomer resins include binary copolymers formed with an α-olefin and an α,β-unsaturated carboxylic acid having 3 to 8 carbon atoms. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. For the binary copolymer and the ternary copolymer, preferable α-olefins are ethylene and propylene, while preferable α,β-unsaturated carboxylic acids are acrylic acid and methacrylic acid. In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. Two or more ionomer resins may be used in combination.

The resin composition of the mid layer 6 may include a polystyrene, a polyamide, a polyester, a polyolefin, a polyurethane, or the like instead of an ionomer resin or together with an ionomer resin.

The resin composition of the mid layer 6 may include a coloring agent such as titanium dioxide, a filler such as barium sulfate, a dispersant, an antioxidant, an ultraviolet absorber, a light stabilizer, a fluorescent material, a fluorescent brightener, and the like. For the purpose of adjusting specific gravity, the resin composition may include powder of a metal with a high specific gravity such as tungsten, molybdenum, and the like.

In light of controllability, the mid layer 6 has a thickness Tm of preferably not less than 0.2 mm and particularly preferably not less than 0.3 mm. In light of resilience performance, the thickness Tm is preferably not greater than 2.5 mm and particularly preferably not greater than 2.2 mm. The thickness Tm of the mid layer 6 is measured at a position immediately below the land 18.

In light of flight performance, the mid layer 6 has a Shore D hardness Hm of preferably not less than 25 and particularly preferably not less than 30. In light of controllability, the hardness Hm is preferably not greater than 60 and particularly preferably not greater than 55.

The hardness Hm of the mid layer 6 is measured according to the standards of "ASTM-D 2240-68". The hardness Hm is measured with a Shore D type hardness scale mounted to an automated hardness meter (trade name "digi test II" manufactured by Heinrich Bareiss Prüfgerätebau GmbH). For the measurement, a sheet that is formed by hot press, is formed from the same material as that of the mid layer 6, and has a thickness of about 2 mm is used. Prior to the measurement, a sheet is kept at 23° C. for two weeks. At the measurement, three sheets are stacked.

In the golf ball 2, the cover 8 is formed outside the mid layer 6. The cover 8 may include two or more layers. Another layer may be further provided between the mid layer 6 and the cover 8. As necessary, the golf ball 2 can include a reinforcing layer for suppressing separation of the cover 8 from the mid layer 6. As the base polymer of a resin composition of the reinforcing layer, a two-component curing type thermosetting resin is suitably used. In light of strength and durability, two-component curing type epoxy resins and two-component curing type urethane resins are preferable.

The cover 8 is formed from a resin composition. Examples of the base resin of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins are preferable. Ionomer resins are highly elastic. The golf ball 2 that includes the cover 8 including an ionomer resin has excellent resilience performance.

An ionomer resin and another resin may be used in combination. In this case, in light of resilience performance, the ionomer resin is included as the principal component of the base resin. The proportion of the ionomer resin to the entire base resin is preferably not less than 50% by weight, more preferably not less than 70% by weight, and particularly preferably not less than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid. Another particularly preferable ionomer resin is a copolymer formed with ethylene and methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7329", and "Himilan AM7337", manufactured by Du Pont-MITSUI POLYCHEMICALS Co., Ltd.;

trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

The resin composition of the cover 8 may include a styrene block-containing thermoplastic elastomer. The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferable. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably not less than 10% by weight, more preferably not less than 12% by weight, and particularly preferably not less than 15% by weight. In light of feel at impact, the content is preferably not greater than 50% by weight, more preferably not greater than 47% by weight, and particularly preferably not greater than 45% by weight.

In the present invention, styrene block-containing thermoplastic elastomers include an alloy of an olefin and one or more members selected from the group consisting of SBS, SIS, SIBS, SEBS, SEPS, and SEEPS. The olefin component in the alloy is presumed to contribute to improvement of compatibility with another base polymer. The alloy can contribute to the resilience performance of the golf ball 2. An olefin having 2 to 10 carbon atoms is preferable. Examples of suitable olefins include ethylene, propylene, butene, and pentene. Ethylene and propylene are particularly preferable.

Specific examples of polymer alloys include trade names "RABALON T3221C", "RABALON T3339C", "RABALON SJ4400N", "RABALON SJ5400N", "RABALON SJ6400N", "RABALON SJ7400N", "RABALON SJ8400N", "RABALON SJ9400N", and "RABALON SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "SEPTON HG-252" manufactured by Kuraray Co., Ltd.

In light of controllability, the proportion of the styrene block-containing thermoplastic elastomer to the entire base resin is preferably not less than 2% by weight, more preferably not less than 4% by weight, and particularly preferably not less than 6% by weight. In light of spin suppression, this proportion is preferably not greater than 30% by weight, more preferably not greater than 25% by weight, and particularly preferably not greater than 20% by weight.

The resin composition of the cover 8 may include an olefin copolymer. Examples of the olefin copolymer include binary copolymers formed with an α-olefin and an α,β-unsaturated carboxylic acid having 3 to 8 carbon atoms, and ternary copolymers formed with: an α-olefin; an α,β-unsaturated carboxylic acid having 3 to 8 carbon atoms; and an α,β-unsaturated carboxylate ester having 2 to 22 carbon atoms. Such binary copolymers are more preferable. A preferable binary copolymer is an ethylene-(meth)acrylic acid copolymer. This copolymer includes 3% by weight or greater but 25% by weight or less of a (meth)acrylic acid component. An ethylene-methacrylic acid copolymer having a polar functional group is preferable. Specific examples of the ethylene-methacrylic acid copolymer include trade names "NUCREL N1050H", "NUCREL N1110H", and "NUCREL N1035", manufactured by Du Pont-MITSUI POLYCHEMICALS Co., Ltd, and the like.

The resin composition of the cover 8 may include a coloring agent, a filler, a dispersant, an antioxidant, an ultraviolet absorber, a light stabilizer, a fluorescent material, a fluorescent brightener, and the like in an adequate amount. When the hue of the golf ball 2 is white, a typical coloring agent is titanium dioxide.

In the present invention, the cover 8 has a thickness Tc of not less than 0.80 mm and not greater than 1.80 mm. The cover 8 having a thickness Tc of not less than 0.80 mm contributes to a high spin rate upon an approach shot. From this viewpoint, the thickness Tc is preferably not less than 0.90 mm and particularly preferably not less than 1.00 mm. The cover 8 having a thickness Tc of not greater than 1.80 mm contributes to spin suppression upon a shot with a driver. From this viewpoint, the thickness Tc is preferably not greater than 1.70 mm and particularly preferably not greater than 1.60 mm. The thickness Tc is measured at a position immediately below the land 18.

In the present invention, the cover 8 has a Shore D hardness Hc of not less than 50 and not greater than 65. The cover 8 having a hardness Hc of not less than 50 contributes to spin suppression upon a shot with a driver.

From this viewpoint, the hardness Hc is preferably not less than 52 and particularly preferably not less than 53. The cover 8 having a hardness Hc of not greater than 65 contributes to a high spin rate upon an approach shot. From this viewpoint, the hardness Hc is preferably not greater than 63 and particularly preferably not greater than 61. The hardness Hc of the cover 8 is measured by the same method as that for the hardness Hm of the mid layer 6.

In the golf ball 2, the paint film 10 including the inner layer 12 and the outer layer 14 is formed outside the cover 8. In the present invention, a 10% modulus Mo of the outer layer 14 is lower than a 10% modulus Mi of the inner layer 12. The outer layer 14 having a low modulus Mo can contribute to a high spin rate in a dry state. The golf ball 2 including the outer layer 14 has excellent controllability upon an approach shot in a dry state.

Furthermore, in the present invention, the difference (Mi−Mo) between the modulus Mi of the inner layer 12 and the modulus Mo of the outer layer 14 is not less than 25.0 kgf/cm$^2$. The inner layer 12 having a modulus Mi higher than the modulus Mo of the outer layer 14 by 25.0 kgf/cm$^2$ or greater is hard. The hard inner layer 12 can contribute to a high spin rate in a wet state. In the golf ball 2, controllability upon an approach shot in a wet state is improved by the inner layer 12 having a high modulus Mi.

As described above, in the golf ball 2, the hardness Hc and the thickness Tc of the cover 8 are set within the predetermined numerical ranges. As a result of thorough research, the present inventors have found that flight performance upon a shot with a driver is maintained by the cover 8, which has an appropriate hardness Hc and an appropriate thickness Tc, suppressing excessive spin that can be caused by the inner layer 12 and the outer layer 14. In the golf ball 2 according to the present invention, a large flight distance upon a shot with a driver and excellent controllability upon approach shots in a dry state and in a wet state are achieved in a well-balanced manner by the synergetic effect of: the inner layer 12 and the outer layer 14 having appropriate moduli; and the cover 8 having an appropriate hardness Hc and an appropriate thickness Tc.

In light of controllability in a wet state and in a dry state, the difference (Mi−Mo) is preferably not less than 45.0 kgf/cm$^2$ and particularly preferably not less than 65.0 kgf/cm$^2$. In light of adhesion between the inner layer 12 and the outer layer 14, the difference (Mi−Mo) is preferably not greater than 400.0 kgf/cm$^2$, more preferably not greater than 375.0 kgf/cm$^2$, and particularly preferably not greater than 350.0 kgf/cm$^2$.

In light of controllability in a wet state, the modulus Mi of the inner layer 12 is preferably not less than 100.0 kgf/cm$^2$, more preferably not less than 125.0 kgf/cm$^2$, and particularly preferably not less than 150.0 kgf/cm$^2$. In light of durability of the inner layer 12 and controllability in a dry state, the modulus Mi is preferably not greater than 500.0 kgf/cm$^2$, more preferably not greater than '450.0 kgf/cm$^2$, and particularly preferably not greater than 400.0 kgf/cm$^2$.

In light of durability, the inner layer 12 has a maximum elongation (amount of strain at fracture) of preferably not less than 30%, more preferably not less than 40%, and particularly preferably not less than 50%. In light of controllability in a wet state, the maximum elongation of the inner layer 12 is preferably not greater than 200%, more preferably not greater than 175%, and particularly preferably not greater than 150%.

In light of stain resistance, the modulus Mo of the outer layer 14 is preferably not less than 5.0 kgf/cm$^2$, more preferably not less than 10.0 kgf/cm$^2$, and particularly preferably not less than 15.0 kgf/cm$^2$. In light of controllability in a dry state, the modulus Mo is preferably less than 100.0 kgf/cm$^2$, more preferably not greater than 90.0 kgf/cm$^2$, and particularly preferably not greater than 80.0 kgf/cm$^2$.

In light of controllability in a dry state, the outer layer 14 has a maximum elongation of preferably not less than 100%, more preferably not less than 120%, and particularly preferably not less than 140%. In light of stain resistance, the maximum elongation of the outer layer 14 is preferably not greater than 500%, more preferably not greater than 450%, and particularly preferably not greater than 400%.

The 10% moduli and the maximum elongations of the inner layer 12 and the outer layer 14 are measured by the tensile test specified in "JIS K7161 (2014)". In the measurement, a paint film having a thickness of about 0.05 mm is prepared. The paint film is formed by drying at 40° C. for 4 hours. The obtained paint film is punched into the shape of type 2 specified in "JIS K7127 (1999)", to obtain a test piece. In the test piece, the width of a parallel portion is 10 mm, and the distance between reference lines is 50 mm. The test piece is subjected to a tensile test (distance between chucks: 100 mm, tension speed: 50 mm/min, test temperature: 23° C.) with a precision universal tester (trade name "Autograph" manufactured by Shimadzu Corporation).

In light of controllability in a wet state, the inner layer 12 has a thickness Ti of preferably not less than 5 pm, more preferably not less than 7 μm, and particularly preferably not less than 8 μm. In light of durability, the thickness Ti is preferably not greater than 30 μm, more preferably not greater than 27.5 μm, and particularly preferably not greater than 25 μm.

In light of controllability in a dry state, the outer layer 14 has a thickness To of preferably not less than 5 μm, more preferably not less than 7 μm, and particularly preferably not less than 8 μm. In light of stain resistance, the thickness To is preferably not greater than 30 μm, more preferably not greater than 27.5 μm, and particularly preferably not greater than 25 μm.

In light of controllability in a dry state, the ratio (To/Ti) of the thickness To of the outer layer 14 and the thickness Ti of the inner layer 12 is preferably not less than 0.2, more preferably not less than 0.3, and particularly preferably not less than 0.4. In light of controllability in a wet state, the ratio (To/Ti) is preferably not greater than 5, more preferably not greater than 4, and particularly preferably not greater than 3. The sum (Ti+To) of the thickness Ti of the inner layer 12 and the thickness To of the outer layer 14 is preferably not less than 10 μm and not greater than 60 μm. In the case where the paint film 10 includes another layer between the inner layer 12 and the outer layer 14, the total thickness of all the layers forming the paint film 10 is set to be not less than 10 μm and not greater than 60 μm. The paint film 10 having a total thickness of not less than 10 μm can contribute to controllability in a dry state and in a wet state. From this viewpoint, the total thickness of the paint film 10 is more preferably not less than 13 μm and particularly preferably not less than 15 μm. In the golf ball 2 that includes the paint film 10 having a total thickness of not greater than 60 μm, the effect achieved by the cover 8 is not impaired. From this viewpoint, the total thickness of the paint film 10 is more preferably not greater than 50 μm and particularly preferably not greater than 40 μm.

The inner layer 12 is formed from a resin composition. Examples of the base resin of the resin composition include polyurethanes, epoxy resins, acrylic resins, polyvinyl acetate resins, and polyesters. Particularly preferable base resins are polyurethanes.

The outer layer 14 is formed from a resin composition. Examples of the base resin of the resin composition include polyurethanes, epoxy resins, acrylic resins, polyvinyl acetate resins, and polyesters. Particularly preferable base resins are polyurethanes.

Typically, each of the inner layer 12 and the outer layer 14 is formed from a polyurethane paint. The paint contains (A) a polyol composition and (B) a polyisocyanate composition. In the paint, the polyol composition (A) is a base material, and the polyisocyanate composition (B) is a curing agent.

The polyol composition (A) contains a polyol compound. The polyol compound has two or more hydroxyl groups within the molecule thereof. The polyol compound may be (a1) a polyol compound having a hydroxyl group at an end of the molecular chain thereof, or may be (a2) a polyol compound having a hydroxyl group at a portion of the molecular chain other than the ends thereof. The polyol composition (A) may contain two or more polyol compounds.

The polyol compound (a1) having a hydroxyl group at an end of the molecular chain thereof includes a low-molecular-weight polyol and a high-molecular-weight polyol. The low-molecular-weight polyol has a number average molecular weight of less than 500. The high-molecular-weight polyol has a number average molecular weight of not less than 500. Examples of the low-molecular-weight polyol include: diols such as ethylene glycol, diethylene glycol, triethylene glycol, 1,3-butanediol, 1,4-butanediol, neopentyl glycol, and 1,6-hexanediol; and triols such as glycerin, trimethylol propane, and hexanetriol.

Examples of the high-molecular-weight polyol include: polyether polyols, polyester polyols, polycaprolactone polyols, polycarbonate polyols, urethane polyols, and acrylic polyols. Examples of polyether polyols include polyoxyethylene glycol (PEG), polyoxypropylene glycol (PPG), and polyoxytetramethylene glycol (PTMG). Examples of polyester polyols include polyethylene adipate (PEA), polybutylene adipate (PBA), and polyhexamethylene adipate (PHMA). Examples of polycaprolactone polyols include poly-ε-caprolactone (PCL). Examples of polycarbonate polyols include polyhexamethylene carbonate.

The urethane polyol has two or more urethane bonds and two or more hydroxyl groups. The urethane polyol can be obtained by causing a reaction of a polyol component and a polyisocyanate component under a condition that the hydroxyl groups of the polyol component are excessive with respect to the isocyanate groups of the polyisocyanate component.

Examples of the polyol component, which is a starting material of the urethane polyol, include polyether diols, polyester diols, polycaprolactone diols, and polycarbonate diols. A preferable polyol component is a polyether diol such as polyoxyethylene glycol, polyoxypropylene glycol, polyoxytetramethylene glycol, or the like. Polyoxytetramethylene glycol is more preferable.

The polyether diol preferably has a number average molecular weight of not less than 600. The polyether diol having a number average molecular weight of not less than 600 can contribute to the flexibility of the paint film 10. From this viewpoint, the molecular weight is more preferably not less than 650 and particularly preferably not less than 700. The molecular weight is preferably not greater than 3,000. The polyether diol having a molecular weight of not greater than 3,000 can contribute to the stain resistance of the paint film 10. From this viewpoint, the molecular weight is more preferably not greater than 2,500 and particularly preferably not greater than 2,000. The number average molecular weight of the polyol component is measured by gel permeation chromatography (GPC). The measurement conditions are as follows.

Reference material: polystyrene
Eluant: tetrahydrofuran
Column: organic solvent GPC column ("Shodex K F Series" manufactured by Showa Denko K. K.)

A urethane polyol including 70% by weight or greater of a polyether diol is preferable. The urethane polyol can contribute to the flexibility of the paint film 10. From this viewpoint, the content of the polyether diol in the urethane polyol is more preferably not less than 72% by weight and particularly preferably not less than 75% by weight.

A low-molecular-weight polyol can be used as the polyol component, which is the starting material of the urethane polyol. Examples of the low-molecular-weight polyol include: diols such as ethylene glycol, diethylene glycol, triethylene glycol, 1,3-butanediol, 1,4-butanediol, neopentyl glycol, and 1,6-hexanediol; and triols such as glycerin, trimethylol propane, and hexanetriol. Two or more low-molecular-weight polyols may be used as the starting material.

A urethane polyol for which a diol and a triol are used in combination as the starting material is preferable. The weight ratio (triol component/diol component) of the triol component and the diol component is preferably not less than 0.2 and particularly preferably not less than 0.5. The weight ratio is preferably not greater than 6.0 and particularly preferably not greater than 5.0. A triol suitable to be used in combination with a diol is trimethylol propane.

The polyisocyanate component, which is a starting material of the urethane polyol, has two or more isocyanate groups. Examples of the polyisocyanate component include: aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and aliphatic polyisocyanates. As the starting material, two or more polyisocyanates may be used.

The urethane polyol preferably has a weight average molecular weight of not less than 5,000. The urethane polyol having a weight average molecular weight of not less than 5,000 can contribute to the flexibility of the paint film 10. From this viewpoint, the molecular weight is more preferably not less than 5,300 and particularly preferably not less than 5,500. The molecular weight is preferably not greater than 20,000. The urethane polyol having a molecular weight of not greater than 20,000 can contribute to the stain resistance of the paint film 10. From this viewpoint, the molecular weight is more preferably not greater than 18,000 and particularly preferably not greater than 16,000.

The urethane polyol has a hydroxyl value of preferably not less than 10 mg KOH/g, more preferably not less than 15 mg KOH/g, and particularly preferably not less than 20 mg KOH/g. The hydroxyl value is preferably not greater than 200 mg KOH/g, more preferably not greater than 190 mg KOH/g, and particularly preferably not greater than 180 mg KOH/g. The hydroxyl value is measured according to the standards of "JIS K 1557-1". For the measurement, the acetylation method is adopted.

Examples of the polyol compound (a2) having a hydroxyl group at the portion of the molecule other than the ends thereof include a modified polyrotaxane having a hydroxyl group, and a hydroxyl group-modified vinyl chloride-vinyl acetate copolymer.

The modified polyrotaxane having a hydroxyl group has cyclodextrins, a linear molecule, and a blocking group. The cyclodextrins are ring molecules. The linear molecule is threaded through the cyclodextrins. The blocking group is located at each of both ends of the linear molecule.

The blocking group prevents detachment of the cyclodextrins from the linear molecule. In the polyrotaxane, the cyclodextrins are movable along the linear molecule. When tension is applied to the paint film 10 including the polyrotaxane, the tension is distributed. In the paint film 10, cracking and scuff are less likely to occur.

The cyclodextrins are oligosaccharides having a ring structure. In the cyclodextrins, 6 to 8 D-glucopyranose units are linked to each other by a-1,4-glucoside linkage to form a ring. Examples of the cyclodextrins include α-cyclodextrin (the number of glucoses: 6), β-cyclodextrin (the number of glucoses: 7), and γ-cyclodextrin (the number of glucoses: 8). α-cyclodextrin is preferable. Two or more types of cyclodextrins may be used in combination.

Examples of the linear molecule threaded through the cyclodextrins include polyalkylenes, polyesters, polyethers, and polyacrylics. Polyethers are preferable, and polyethylene glycol is particularly preferable.

The weight average molecular weight of the linear molecule is preferably not less than 5,000 and particularly preferably not less than 6,000. The molecular weight is preferably not greater than 100,000 and particularly preferably not greater than 80,000.

A linear molecule having functional groups at both ends thereof is preferable. The linear molecule can easily react with the blocking group. Examples of the functional groups include hydroxyl group, carboxy group, amino group, and thiol group.

Examples of a method for preventing detachment of the cyclodextrins by the blocking group include a physical prevention method with a bulky blocking group, and an electrostatic prevention method with an ionic blocking group. Examples of the bulky blocking group include cyclodextrins and adamantane group. The ratio of the number of the cyclodextrins through which the linear molecule is threaded, relative to the maximum number of the cyclodextrins, is preferably not less than 0.06 and not greater than 0.61, more preferably not less than 0.11 and not greater than 0.48, and particularly preferably not less than 0.24 and not greater than 0.41. The paint film 10 in which the ratio falls within the above range has excellent physical properties.

A polyrotaxane in which at least a part of the hydroxyl groups included in each cyclodextrin is modified with a caprolactone chain is preferable. With the polyrotaxane, steric hindrance between the polyrotaxane and a polyisocyanate compound which is a curing agent is alleviated.

Hereinafter, one example of a method for the modification will be described. First, the hydroxyl groups of each cyclodextrin are treated with propylene oxide to be hydroxypropylated. Next, ε-caprolactone is added to cause ring-opening polymerization. Accordingly, a caprolactone chain —(CO(CH$_2$)$_5$O)nH is bonded to the outside of the ring structure of the cyclodextrin via a —O—C$_3$H$_6$—O— group. The "n" represents a degree of polymerization, and is preferably a natural number of 1 to 100, more preferably a natural number of 2 to 70, and particularly preferably a natural number of 3 to 40. By the ring-opening polymerization, a hydroxyl group is formed at the other end of the caprolactone chain. The hydroxyl group can react with the polyisocyanate compound.

The proportion of the hydroxyl groups modified with a caprolactone chain to all the hydroxyl groups (100 mol %) included in the cyclodextrin that has not been modified is preferably not less than 2 mol %, more preferably not less than 5 mol %, and further preferably not less than 10 mol %. The polyrotaxane in which the proportion falls within the above range is hydrophobic. The reactivity of the polyrotaxane with the polyisocyanate compound is high.

The polyrotaxane preferably has a hydroxyl value of not less than 10 mg KOH/g and not greater than 400 mg KOH/g. The reactivity of the polyrotaxane with the polyisocyanate compound is high. From this viewpoint, the hydroxyl value is more preferably not less than 15 mg KOH/g and particularly preferably not less than 20 mg KOH/g. The hydroxyl value is more preferably not greater than 300 mg KOH/g and particularly preferably not greater than 220 mg KOH/g.

The polyrotaxane preferably has a weight average molecular weight of not less than 30,000 and not greater than 3,000,000. The polyrotaxane having a molecular weight of not less than 30,000 can contribute to the strength of the paint film 10. From this viewpoint, the molecular weight is more preferably not less than 40,000 and particularly preferably not less than 50,000. The polyrotaxane having a molecular weight of not greater than 3,000,000 can contribute to the flexibility of the paint film 10. From this viewpoint, the molecular weight is more preferably not greater than 2,500,000 and particularly preferably not greater than 2,000,000. The molecular weight is measured by gel permeation chromatography (GPC). The measurement conditions are as follows.

Reference material: polystyrene
Eluant: tetrahydrofuran
Column: organic solvent GPC column ("Shodex KF Series" manufactured by Showa Denko K.K.)

Specific examples of the polyrotaxane modified with polycaprolactone include trade names "SeRM Super Polymer SH3400P", "SeRM Super Polymer SH2400P", and "SeRM Super Polymer SH1310P", manufactured by Advanced Softmaterials Inc.

The hydroxyl group-modified vinyl chloride-vinyl acetate copolymer which is one example of the polyol compound (a2) having a hydroxyl group at the portion of the molecular chain other than the ends thereof can contribute to the spin performance of the golf ball 2. The copolymer can be obtained by copolymerization of a monomer having a hydroxyl group, vinyl chloride, and vinyl acetate. Examples of the monomer having a hydroxyl group include polyvinyl alcohol and hydroxyalkyl acrylate. The copolymer can also be obtained by partial saponification or full saponification of a vinyl chloride-vinyl acetate copolymer.

The content of the vinyl chloride component in the hydroxyl group-modified vinyl chloride-vinyl acetate copolymer is preferably not less than 1% by weight, more preferably not less than 20% by weight, and particularly preferably not less than 50% by weight. The content is preferably not greater than 99% by weight and particularly preferably not greater than 95% by weight. Specific examples of the hydroxyl group-modified vinyl chloride-vinyl acetate copolymer include trade names "Solbin A", "Solbin AL", and "Solbin TA3", manufactured by Nissin Chemical Industry Co., Ltd.

Embodiments of a preferable polyol composition (A) for obtaining the paint film 10 are as follows.

Embodiment 1: a composition including a urethane polyol containing a polyether diol having a number average molecular weight of not less than 600 and not greater than 3,000.

Embodiment 2: a composition including a polyrotaxane in which at least a part of the hydroxyl groups included in each cyclodextrin is modified with a caprolactone chain via a —O—$C_3H_6$—O— group.

The proportion of the urethane polyol to the entire polyol compound in the polyol composition (A) of Embodiment 1 is preferably not less than 60% by weight, more preferably not less than 70% by weight, and particularly preferably not less than 80% by weight. The polyol composition (A) may include only the urethane polyol as the polyol compound.

The proportion of the polyrotaxane to the entire polyol compound in the polyol composition (A) of Embodiment 2 is preferably not less than 10% by weight, more preferably not less than 15% by weight, and particularly preferably not less than 20% by weight. The proportion is preferably not greater than 100% by weight, more preferably not greater than 90% by weight, and particularly preferably not greater than 85% by weight.

The polyol composition (A) of Embodiment 2 preferably contains a polycaprolactone polyol. The weight ratio of the polycaprolactone polyol and the polyrotaxane is preferably not less than 0/100, more preferably not less than 5/95, and particularly preferably not less than 10/90. The ratio is preferably not greater than 90/10, more preferably not greater than 85/15, and particularly preferably not greater than 80/20.

The polyol composition (A) of Embodiment 2 preferably contains the aforementioned hydroxyl group-modified vinyl chloride-vinyl acetate copolymer. The proportion of the hydroxyl group-modified vinyl chloride-vinyl acetate copolymer to the entire polyol compound in the polyol composition (A) is preferably not less than 4% by weight and particularly preferably not less than 8% by weight. The proportion is preferably not greater than 50% by weight and particularly preferably not greater than 45% by weight.

The polyisocyanate composition (B) which is a curing agent contains a polyisocyanate compound. The polyisocyanate compound has two or more isocyanate groups.

Examples of the polyisocyanate compound include:

aromatic diisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic or aliphatic diisocyanates such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and triisocyanates such as an allophanate product, a biuret product, an isocyanurate product, an adduct product of diisocyanates. The polyisocyanate composition (B) may include two or more polyisocyanate compounds.

The allophanate product can be obtained by a diisocyanate further reacting with a urethane bond formed by a reaction of a diisocyanate and a low-molecular-weight diol. The adduct product can be obtained by a reaction of a diisocyanate and a low-molecular-weight triol such as trimethylol propane, glycerin, or the like. The biuret product has a biuret bond represented by the following chemical formula (1). The isocyanurate product is, for example, represented by the following chemical formula (2).

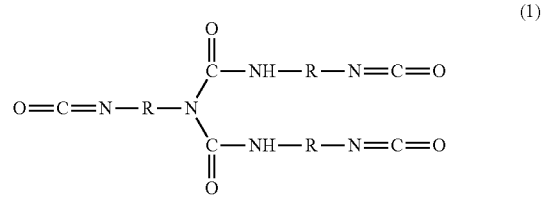

(1)

In the chemical formula (1), R represents a residue obtained by eliminating the isocyanate groups from a diisocyanate.

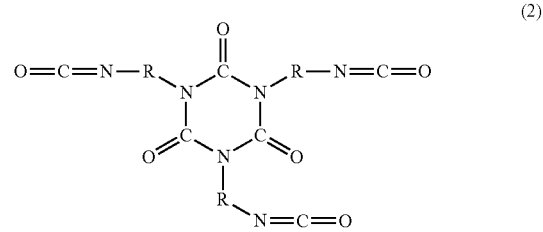

(2)

In the chemical formula (2), R represents a residue obtained by eliminating the isocyanate groups from a diisocyanate.

Examples of preferable triisocyanates include an isocyanurate product of hexamethylene diisocyanate, a biuret product of hexamethylene diisocyanate, and an isocyanurate product of isophorone diisocyanate.

Preferably, the polyisocyanate composition (B) contains triisocyanates. The proportion of the triisocyanates to the entire polyisocyanate compound in the polyisocyanate composition (B) is preferably not less than 50% by weight, more preferably not less than 60% by weight, and particularly preferably not less than 70% by weight. The polyisocyanate composition (B) may contain only the triisocyanates as the polyisocyanate compound.

The isocyanate group amount (NCO%) of the polyisocyanate compound contained in the polyisocyanate composition (B) is preferably not less than 0.5% by weight, more preferably not less than 1.0% by weight, and particularly preferably not less than 2.0% by weight. The isocyanate group amount is preferably not greater than 45% by weight, more preferably not greater than 40% by weight, and particularly preferably not greater than 35% by weight. The isocyanate group amount (NCO%) is calculated by the following mathematical formula.

$$NCO = (100 \times Mi \times 42)/Wi$$

Mi: the number of moles of the isocyanate groups in the polyisocyanate compound

42: the molecular weight of NCO

Wi: the total weight (g) of the polyisocyanate compound

Specific examples of the polyisocyanate compound include: trade names "BURNOCK D-800", "BURNOCK DN-950", "BURNOCK DN-955", manufactured by DIC corporation; trade names "Desmodur N 75 MPA/X", "Desmodur N 3300", "Desmodur L 75 (C)", and "Sumidur E21-1", manufactured by Sumika Bayer Urethane CO., Ltd.; trade names "CORONATE HX" and "CORONATE HK", manufactured by Tosoh Corporation; trade names "DURANATE 24A-100", "DURANATE 21S-75E", "DURANATE TPA-100", and "DURANATE TKA-100", manufactured by Asahi Kasei Chemicals Corporation; and trade name "VESTANAT T1890" manufactured by Degussa AG.

In the polyurethane paint forming the paint film 10, the mole ratio (NCO/OH) of the hydroxyl group (OH group) of the base material and the isocyanate group (NCO group) of the curing agent is preferably not less than 0.10. In the polyurethane paint in which this mole ratio is not less than 0.10, a sufficient curing reaction takes place. From this viewpoint, this mole ratio is particularly preferably not less than 0.20. From the viewpoint that the paint film 10 having excellent appearance is obtained, the mole ratio (NCO/OH) is preferably not greater than 1.50, more preferably not greater than 1.40, and particularly preferably not greater than 1.30. The reason why the appearance of the paint film 10 is excellent is that an excessive reaction does not take place between the isocyanate group and the moisture in the air. Suppression of an excessive reaction suppresses generation of carbon dioxide gas, so that impairment of the appearance by the carbon dioxide gas is suppressed.

Polyisocyanate compounds suitable for the polyol composition (A) of Embodiment 1 described above are a biuret-modified product of hexamethylene diisocyanate, an isocyanurate-modified product of hexamethylene diisocyanate, and an isocyanurate-modified product of isophorone diisocyanate. A biuret-modified product of hexamethylene diisocyanate and an isocyanurate-modified product of hexamethylene diisocyanate may be used in combination. In this case, the weight ratio of the biuret-modified product and the isocyanurate-modified product is preferably not less than 20/40 and not greater than 40/20, and particularly preferably not less than 25/35 and not greater than 35/25.

A polyisocyanate compound suitable for the polyol composition (A) of Embodiment 2 described above is an isocyanurate-modified product of hexamethylene diisocyanate.

For the paint film 10, both a water-based paint containing water as a main dispersion medium and a solvent-based paint containing an organic solvent as a dispersion medium can be used. The solvent-based paint is preferable. Examples of a solvent suitable for the solvent-based paint include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate. The polyol composition (A) may include a solvent. The polyisocyanate composition (B) may include a solvent. In light of uniform curing reaction, each of the polyol composition (A) and the polyisocyanate composition (B) preferably includes a solvent.

Preferably, the paint contains a leveling agent. The leveling agent can contribute to smoothness of the paint film 10. A preferable leveling agent is a modified silicone. Examples of the modified silicone include a polysiloxane having an organic group introduced to a side chain or an end thereof, a polysiloxane block copolymer obtained by copolymerizing a polyether block, a polycaprolactone block, or the like with a polysiloxane block, and a copolymer obtained by introducing an organic group to a side chain or an end of the polysiloxane block copolymer. The polysiloxane block or the polysiloxane that is linear is preferably modified. Examples of the polysiloxane block or the polysiloxane that is linear include dimethyl polysiloxane, methylphenyl polysiloxane, and methyl hydrogen polysiloxane. Examples of the organic group that can be introduced include amino group, epoxy group, mercapto group, and carbinol group. A preferable modified silicone is a polydimethylsiloxane-polycaprolactone block copolymer. A particularly preferable modified silicone is a modified polydimethylsiloxane-polycaprolactone block copolymer having a carbinol group at an end thereof. The copolymer has excellent compatibility with a caprolactone-modified polyrotaxane and a polycaprolactone polyol. Specific examples of the modified silicone include trade names "DBL-C31", "DBE-224", and "DCE-7521", manufactured by Gelest, Inc.

For a curing reaction, a known catalyst can be used. Examples of preferable catalysts include: monoamines such as triethylamine and N,N-dimethylcyclohexylamine; polyamines such as N,N,N',N'-tetramethylethylenediamine and N,N,N',N'',N''-pentamethyldiethylenetriamine; cyclic diamines such as 1,8-diazabicyclo-[5.4.0]-7-undecene (DBU) and triethylenediamine; and tin-based catalysts such as dibutyltin dilaurate and dibutyltin diacetate. Two or more catalysts may be used in combination. Tin-based catalysts are more preferable, and dibutyltin dilaurate is particularly preferable.

The paint may include additives, such as a filler, an ultraviolet absorber, an antioxidant, a light stabilizer, a fluorescent brightener, an anti-blocking agent, a slipping agent, a viscosity modifier, and the like, in an adequate amount.

The paint is applied by a spray coating method, an electrostatic coating method, or the like. In the case of spray coating with an air gun, a line mixer can be disposed upstream of the air gun. The polyol composition (A) is supplied to the line mixer by a pump. The polyisocyanate composition (B) is supplied to the line mixer by another pump. In the line mixer, the polyol composition (A) and the polyisocyanate composition (B) are continuously mixed. A paint obtained by the mixing is sprayed from the air gun. The polyol composition (A) and the polyisocyanate composition (B) may be applied separately.

The inner layer 12 is formed by applying a first paint to the outer surface of the cover 8 of the golf ball 2 and drying the first paint. The drying temperature is preferably not lower than 30° C. and not higher than 70° C. The drying time is preferably not shorter than 1 hour and not longer than 24 hours.

In the golf ball 2, the outer layer 14 is formed by applying a second paint to the outer surface of the inner layer 12 and drying the second paint. The drying temperature is preferably not lower than 30° C. and not higher than 70° C. The drying time is preferably not shorter than 1 hour and not longer than 24 hours.

The paint film 10 having a great difference (Mi-Mo) can be obtained by using a first paint having a high mole ratio (NCO/OH) for the inner layer 12 and using a second paint having a low mole ratio (NCO/OH) for the outer layer 14. The paint film 10 having a great difference (Mi-Mo) can be obtained by using a polyurethane paint including a polyol compound having a low molecular weight for the inner layer 12 and using a polyurethane paint including a polyol compound having a high molecular weight for the outer layer 14.

EXAMPLES

The following will show the effects of the present invention by means of Examples, but the present invention should not be construed in a limited manner on the basis of the description of these Examples.

[Preparation of Polyol Composition (A)]
[Polyol composition #1 (Urethane Polyol)]

Polytetramethylene ether glycol (PTMG, number average molecular weight: 650) and trimethylol propane (TMP) were dissolved in a solvent (toluene and methyl ethyl ketone). The mole ratio (PTMG:TMP) was 1.8:1.0. Dibutyltin dilaurate was added to this solution as a catalyst in an amount of 0.1% by weight with respect to the entire base material. While this polyol solution was kept at 80° C., isophorone diisocyanate (IPDI) was dropped and mixed into the polyol solution. The mole ratio (NCO/OH) of this mixture solution was 0.6. After the dropping, the mixture solution was continuously agitated until isocyanate was eliminated. Thereafter, the mixture solution was cooled at normal temperature to obtain a urethane polyol composition #1. The details of this composition are as follows.
Solid content: 30% by weight
Content of PTMG: 67% by weight
Hydroxyl value of solid content: 67.4 mg KOH/g
OH amount of solid content: 1.20 mmol/g
OH amount of composition: 0.36 mmol/g
Weight average molecular weight of urethane polyol: 4,867

[Polyol Composition #2 (Urethane Polyol)]

Polytetramethylene ether glycol (PTMG, number average molecular weight: 1,000) and trimethylol propane (TMP) were dissolved in a solvent (toluene and methyl ethyl ketone). The mole ratio (PTMG:TMP) was 1.8:1.0. Dibutyltin dilaurate was added to this solution as a catalyst in an amount of 0.1% by weight with respect to the entire base material. While this polyol solution was kept at 80° C., isophorone diisocyanate (IPDI) was dropped and mixed into the polyol solution. The mole ratio (NCO/OH) of this mixture solution was 0.6. After the dropping, the mixture solution was continuously agitated until isocyanate was eliminated. Thereafter, the mixture solution was cooled at normal temperature to obtain a urethane polyol composition #2. The details of this composition are as follows.
Solid content: 30% by weight
Content of PTMG: 76% by weight
Hydroxyl value of solid content: 49.5 mg KOH/g
OH amount of solid content: 0.88 mmol/g
OH amount of composition: 0.26 mmol/g
Weight average molecular weight of urethane polyol: 6,624

[Polyol Composition #3 (Polyrotaxane Composition)]

A polyol composition #3 was prepared by mixing 50 parts by weight of a polyrotaxane in which at least a part of the hydroxyl groups of each cyclodextrin is modified with a caprolactone chain via a —O—$C_3H_6$—O— group (the aforementioned "SeRM Super Polymer", linear molecule: polyethylene glycol, blocking group: adamantane group, molecular weight of linear molecule: 35,000, hydroxyl value: 72 mg KOH/g, weight average molecular weight: 700,000), 28 parts by weight of a polycaprolactone polyol (trade name "Placcel 308", manufactured by Daicel Corporation, hydroxyl value: 190 to 200 mg KOH/g), 22 parts by weight of a vinyl chloride-vinyl acetate-vinyl alcohol copolymer (the aforementioned "Solbin AL", hydroxyl value: 63.4 mg KOH/g), 0.1 parts by weight of a modified silicone (trade name "DBL-C31", manufactured by Gelest, Inc.), 0.01 parts by weight of dibutyltin dilaurate, and 100 parts by weight of a solvent (xylene/methyl ethyl ketone, weight ratio: 70/30).

[Preparation of Polyisocyanate Composition (B)]
[Polyisocyanate Composition #1]

Mixed were 30 parts by weight of an isocyanurate-modified product of hexamethylene diisocyanate (trade name "DURANATE TKA-100", manufactured by Asahi Kasei Chemicals Corporation, NCO content: 21.7% by weight), 30 parts by weight of a biuret-modified product of hexamethylene diisocyanate (trade name "DURANATE 21S-75E", manufactured by Asahi Kasei Chemicals Corporation, NCO content: 15.5% by weight), and 40 parts by weight of an isocyanurate-modified product of isophorone diisocyanate (trade name "Desmodur Z 4470", manufactured by Sumika Bayer Urethane CO., Ltd., NCO content: 11.9% by weight). A mixed solvent of methyl ethyl ketone, n-butyl acetate, and toluene was added as a solvent to this mixture to obtain a polyisocyanate composition #1. The concentration of the polyisocyanate component in the composition was 60% by weight.

[Polyisocyanate Composition #2]

100 parts by weight of a biuret-modified product of hexamethylene diisocyanate (the aforementioned "DURANATE 21S-75E", NCO content: 15.5% by weight) and 100 parts by weight of methyl ethyl ketone were mixed to obtain a polyisocyanate composition #2.

Example 1

A rubber composition T1 was obtained by kneading 100 parts by weight of a high-cis polybutadiene (trade name "BR730", manufactured by JSR Corporation), 31 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.5 parts by weight of diphenyl disulfide (manufactured by Sumitomo Seika Chemicals Co., Ltd.), and 0.7 parts by weight of dicumyl peroxide (trade name "Percumyl D", manufactured by NOF Corporation). The rubber composition T1 was placed into a mold including upper and lower mold halves each having a hemispherical cavity, and heated at 170° C. for 25 minutes to obtain a core with a diameter of 38.1 mm. The amount of barium sulfate was adjusted such that a core having a predetermined weight was obtained.

A resin composition M1 was obtained by kneading 26 parts by weight of an ionomer resin (the aforementioned "Himilan AM7329"), 26 parts by weight of another ionomer resin (the aforementioned "Himilan AM7337"), 48 parts by weight of a styrene block-containing thermoplastic elastomer (the aforementioned "RABALON T3221C"), and 6 parts by weight of titanium dioxide (manufactured by Ishihara Sangyo Kaisha, Ltd.) with a twin-screw kneading extruder. The extruding conditions were a screw diameter of 45 mm, a screw rotational speed of 200 rpm, and screw L/D=35. The resin composition M1 was heated at 160° C. to 230° C. at the position of a die of the extruder. The core was covered with the obtained resin composition M1 by injection molding to form a mid layer with a thickness of 1.00 mm.

A resin composition C1 was obtained by kneading 40 parts by weight of an ionomer resin (the aforementioned "Himilan AM7329"), 43 parts by weight of another ionomer resin (the aforementioned "Himilan AM7337"), 17 parts by weight of a styrene block-containing thermoplastic elastomer (the aforementioned "RABALON T3221C"), and 6 parts by weight of titanium dioxide (manufactured by Ishihara Sangyo Kaisha, Ltd.) with a twin-screw kneading extruder. The sphere consisting of the core and the mid layer was placed into a final mold including upper and lower mold halves each having a hemispherical cavity. The final mold has a large number of pimples on its cavity face. By injection molding, the melted resin composition C1 was injected around the core to form a cover with a thickness of 1.30 mm. Dimples having a shape that is the inverted shape of the pimples were formed on the cover.

A paint P2 was prepared by mixing 100 parts by weight of the polyol composition #1 and 17.0 parts by weight of the polyisocyanate composition #1. The cover was coated with the paint P2. The paint P2 was dried at 40° C. for 24 hours to obtain an inner layer with a thickness of 10 μm.

A paint P6 was prepared by mixing 100 parts by weight of the polyol composition #2 and 19.2 parts by weight of the polyisocyanate composition #1. The inner layer was coated with the paint P6. The paint P6 was dried at 40° C. for 24 hours to obtain an outer layer with a thickness of 10 μm. The diameter of a golf ball having this outer layer was about 42.7 mm, and the weight thereof was about 45.6 g.

Examples 2 to 7 and Comparative Examples 1 to 4

Golf balls of Examples 2 to 7 and Comparative Examples 1 to 4 were obtained in the same manner as Example 1, except the specifications of the paint film were as shown in Tables 5 to 7 below. The specifications of the paint film are shown in detail in Tables 3 and 4 below.

Examples 8 to 13 and Comparative Examples 5 to 8

Golf balls of Examples 8 to 13 and Comparative Examples 5 to 8 were obtained in the same manner as Example 1, except the inner layer was formed by using a paint P4 prepared with a composition shown in Table 3 below and the diameter of the core and the specifications of the cover were as shown in Tables 7 to 9 below. The specifications of the cover are shown in detail in Tables 1 and 2 below.

Example 14

A rubber composition T1 was obtained by kneading 100 parts by weight of a high-cis polybutadiene (trade name "BR730", manufactured by JSR Corporation), 31 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.5 parts by weight of diphenyl disulfide (manufactured by Sumitomo Seika Chemicals Co., Ltd.), and 0.7 parts by weight of dicumyl peroxide (trade name "Percumyl D", manufactured by NOF Corporation). The rubber composition T1 was placed into a mold including upper and lower mold halves each having a hemispherical cavity, and heated at 170° C. for 25 minutes to obtain a core with a diameter of 39.1 mm. The amount of barium sulfate was adjusted such that a core having a predetermined weight was obtained.

A resin composition C1 was obtained by kneading 40 parts by weight of an ionomer resin (the aforementioned "Himilan AM7329"), 43 parts by weight of another ionomer resin (the aforementioned "Himilan AM7337"), 17 parts by weight of a styrene block-containing thermoplastic elastomer (the aforementioned "RABALON T3221C"), and 6 parts by weight of titanium dioxide (manufactured by Ishihara Sangyo Kaisha, Ltd.) with a twin-screw kneading extruder. The sphere consisting of the core and the mid layer was placed into a final mold including upper and lower mold halves each having a hemispherical cavity. The final mold has a large number of pimples on its cavity face. By injection molding, the melted resin composition C1 was injected around the core to form a cover with a thickness of 1.80 mm. Dimples having a shape that is the inverted shape of the pimples were formed on the cover.

A paint P4 was prepared by mixing 100 parts by weight of the polyol composition #1 and 29.0 parts by weight of the polyisocyanate composition #1. The cover was coated with the paint P4. The paint P4 was dried at 40° C. for 24 hours to obtain an inner layer with a thickness of 10 μm.

A paint P6 was prepared by mixing 100 parts by weight of the polyol composition #2 and 19.2 parts by weight of the polyisocyanate composition #1. The inner layer was coated with the paint P6. The paint P6 was dried at 40° C. for 24 hours to obtain an outer layer with a thickness of 10 μm. The diameter of a golf ball having this outer layer was about 42.7 mm, and the weight thereof was about 45.6 g.

Example 15

A golf ball of Example 15 was obtained in the same manner as Example 14, except the diameter of the core and the thickness of the cover were as shown in Table 9 below.

[Flight Performance: Hit with Driver (W#1)]

A driver (trade name "XXIO8", manufactured by DUNLOP SPORTS CO. LTD., shaft hardness: R, loft angle:)10.5° was attached to a swing machine manufactured by Golf Laboratories, Inc. A golf ball was hit under a condition of a head speed of 40 m/s, and the ball speed (m/s), the launch angle (degree), the spin rate (rpm), and the flight distance (yard) were measured. The flight distance is the distance between the point at the hit and the point at which the ball stopped. The average value of data obtained by 20 measurements is shown in Tables 5 to 9 below.

[Controllability: Shot with Sand Wedge (SW)]

A sand wedge (trade name "CG15 Forged Wedge", manufactured by Cleveland Golf Company, loft angle: 52°) was attached to a swing machine manufactured by Golf Laboratories, Inc. A golf ball was hit under a condition of a head speed of 16 m/s, and the spin rate Rd (rpm) under a dry condition was measured by taking a sequence of photographs of the hit golf ball. The spin rate Rw (rpm) under a wet condition was measured by conducting the same test in a state where water was adhered to the face of the sand wedge and the golf ball. The average value of data obtained by 10 times of each measurement and the spin ratio (Rw/Rd) calculated by using the average value are shown in Tables 5 to 9 below. A golf ball having a high spin ratio (Rw/Rd) is highly rated.

[Feel at Impact]

An actual-hitting test was conducted by ten nonprofessional golf players (advanced players) using sand wedges (trade name "CG15 Forged Wedge", manufactured by Cleveland Golf Company, Inc., loft angle: 52°). The evaluation was categorized as follows on the basis of the number of persons who answered that the feeling was good (it was good because of feeling as if the ball was put on the face of the sand wedge, it was good because of feeling as if the ball was caught, it was good because of feeling as if sufficient spin was given, it was good because of feeling as if the ball stuck). The obtained results are shown in Tables 5 to 9 below.

A: 8 persons or more
B: 4 to 7 persons
C: 3 persons or less

TABLE 1

Composition of Cover (parts by weight)

|  | C1 | C2 | C3 | C4 |
|---|---|---|---|---|
| Himilan AM7329 | 40 | 50 | 27 | 45 |
| Himilan AM7337 | 43 | 24 | 53 | 25 |
| RABALON T3221C | 17 | 26 | 20 | 30 |
| Titanium dioxide | 6 | 6 | 6 | 3 |
| Hc (Shore D) | 55 | 53 | 50 | 47 |

TABLE 2

Composition of Cover (parts by weight)

|  | C5 | C6 | C7 |
|---|---|---|---|
| Himilan 1605 | — | 50 | — |
| Himilan AM7329 | 55 | 50 | — |
| Himilan AM7337 | 5 | — | — |
| Himilan 1555 | 10 | — | — |
| NUCREL N1050H | 30 | — | — |
| Surlyn 8150 | — | — | 50 |
| Surlyn 9150 | — | — | 50 |
| JF-90 | 0.2 | — | — |
| Titanium dioxide | 3 | 4 | 3 |
| Hc (Shore D) | 61 | 65 | 70 |

JF-90 listed in Table 2 is bis(2,2,6,6-tetramethyl-4-piperidyl)sebacate (light stabilizer) manufactured by Johoku Chemical Co., Ltd.

TABLE 3

Composition of Paint and Physical Properties of Paint Film

|  | P1 | P2 | P3 | P4 |
|---|---|---|---|---|
| Composition (parts by weight) | | | | |
| Polyol composition #1 | 100 | 100 | 100 | 100 |
| Polyol composition #2 | — | — | — | — |
| Polyol composition #3 | — | — | — | — |
| Polyisocyanate composition #1 | 9.2 | 17.0 | 24.0 | 29.0 |
| Polyisocyanate composition #2 | — | — | — | — |
| Mole ratio (NCO/OH) | 0.38 | 0.70 | 1.00 | 1.20 |
| Physical Properties | | | | |
| 10% modulus (kgf/cm$^2$) | 7.9 | 100.0 | 150.0 | 186.4 |
| 50% modulus (kgf/cm$^2$) | 14.3 | 118.5 | 178.8 | 209.4 |
| 100% modulus (kgf/cm$^2$) | 21.9 | 161.1 | 240.0 | 278.6 |
| Max. modulus (kgf/cm$^2$) | 119.8 | 195.0 | 276.7 | 337.1 |
| Max. elongation (%) | 260.5 | 140.0 | 114.5 | 120.7 |

TABLE 4

Composition of Paint and Physical Properties of Paint Film

|  | P5 | P6 | P7 |
|---|---|---|---|
| Composition (parts by weight) | | | |
| Polyol composition #1 | 100 | — | — |
| Polyol composition #2 | — | 100 | — |
| Polyol composition #3 | — | — | 100 |
| Polyisocyanate composition #1 | 38.6 | 19.2 | — |
| Polyisocyanate composition #2 | — | — | 17.0 |
| Mole ratio (NCO/OH) | 1.60 | 1.04 | 1.03 |
| Physical properties | | | |
| 10% modulus (kgf/cm$^2$) | 274.9 | 75.0 | 8.2 |
| 50% modulus (kgf/cm$^2$) | 250.6 | 110.0 | 32.4 |
| 100% modulus (kgf/cm$^2$) | — | 163.0 | — |
| Max. modulus (kgf/cm$^2$) | 293.3 | 416.0 | 40.2 |
| Max. elongation (%) | 76.4 | 196.0 | 51.4 |

TABLE 5

Results of Evaluation

|  | Comp. Ex. 1 | Ex. 1 | Ex. 2 | Ex. 3 | Ex. 4 |
|---|---|---|---|---|---|
| Core diameter (mm) | 38.1 | 38.1 | 38.1 | 38.1 | 38.1 |
| Mid layer | | | | | |
| Tm (mm) | 1.00 | 1.00 | 1.00 | 1.00 | 1.00 |
| Hm (Shore D) | 35 | 35 | 35 | 35 | 35 |
| Cover | | | | | |
| Composition | C1 | C1 | C1 | C1 | C1 |
| Tc (mm) | 1.30 | 1.30 | 1.30 | 1.30 | 1.30 |
| Hc (Shore D) | 55 | 55 | 55 | 55 | 55 |
| Paint (inner layer) | | | | | |
| Composition | P6 | P2 | P3 | P4 | P5 |
| Mi (kgf/cm$^2$) | 75.0 | 100.0 | 150.0 | 186.4 | 274.9 |
| Ti (μm) | 10 | 10 | 10 | 10 | 10 |
| Paint (outer layer) | | | | | |
| Composition | P6 | P6 | P6 | P6 | P6 |
| Mo (kgf/cm$^2$) | 75.0 | 75.0 | 75.0 | 75.0 | 75.0 |
| To (μm) | 10 | 10 | 10 | 10 | 10 |
| Mi − Mo (kgf/cm$^2$) | 0 | 25.0 | 75.0 | 111.4 | 199.9 |
| Ti + To (μm) | 20 | 20 | 20 | 20 | 20 |
| W#1 ball speed (m/s) | 58.60 | 58.60 | 58.60 | 58.60 | 58.60 |
| W#1 launch angle (deg) | 13.5 | 13.5 | 13.5 | 13.5 | 13.5 |
| W#1 Spin ratio (rpm) | 2750 | 2750 | 2750 | 2750 | 2750 |
| W#1 distance (yd) | 200 | 200 | 200 | 200 | 200 |
| SW spin rate | | | | | |
| Dry Rd (rpm) | 4390 | 4420 | 4430 | 4450 | 4460 |
| Wet Rw (rpm) | 1700 | 1960 | 2100 | 2200 | 2290 |
| ratio (Rw/Rd) | 0.39 | 0.44 | 0.47 | 0.49 | 0.51 |
| Feel at impact | B | B | B | B | B |

TABLE 6

Results of Evaluation

|  | Comp. Ex. 2 | Comp. Ex. 3 | Ex. 5 | Ex. 6 | Ex. 7 |
|---|---|---|---|---|---|
| Core diameter (mm) | 38.1 | 38.1 | 38.1 | 38.1 | 38.1 |
| Mid layer | | | | | |
| Tm (mm) | 1.00 | 1.00 | 1.00 | 1.00 | 1.00 |
| Hm (Shore D) | 35 | 35 | 35 | 35 | 35 |

TABLE 6-continued

Results of Evaluation

| | Comp. Ex. 2 | Comp. Ex. 3 | Ex. 5 | Ex. 6 | Ex. 7 |
|---|---|---|---|---|---|
| Cover | | | | | |
| Composition | C1 | C1 | C1 | C1 | C1 |
| Tc (mm) | 1.30 | 1.30 | 1.30 | 1.30 | 1.30 |
| Hc (Shore D) | 55 | 55 | 55 | 55 | 55 |
| Paint (inner layer) | | | | | |
| Composition | P4 | P1 | P2 | P4 | P4 |
| Mi (kgf/cm$^2$) | 186.4 | 7.9 | 100.0 | 186.4 | 186.4 |
| Ti (μm) | 10 | 10 | 10 | 10 | 10 |
| Paint (outer layer) | | | | | |
| Composition | P4 | P1 | P1 | P1 | P7 |
| Mo (kgf/cm$^2$) | 186.4 | 7.9 | 7.9 | 7.9 | 8.2 |
| To (μm) | 10 | 10 | 10 | 10 | 10 |
| Mi − Mo (kgf/cm$^2$) | 0 | 0 | 92.1 | 178.5 | 178.2 |
| Ti + To (μm) | 20 | 20 | 20 | 20 | 20 |
| W#1 ball speed (m/s) | 58.60 | 58.60 | 58.60 | 58.60 | 58.60 |
| W#1 launch angle (deg) | 13.5 | 13.5 | 13.5 | 13.5 | 13.5 |
| W#1 Spin ratio (rpm) | 2750 | 2750 | 2750 | 2750 | 2750 |
| W#1 distance (yd) | 200 | 200 | 200 | 200 | 200 |
| SW spin rate | | | | | |
| Dry Rd (rpm) | 4470 | 4350 | 4370 | 4380 | 4350 |
| Wet Rw (rpm) | 2520 | 1480 | 1900 | 2150 | 1800 |
| ratio (Rw/Rd) | 0.56 | 0.34 | 0.43 | 0.49 | 0.41 |
| Feel at impact | C | A | A | A | A |

TABLE 7

Results of Evaluation

| | Comp. Ex. 4 | Comp. Ex. 5 | Ex. 8 | Ex. 9 | Ex. 10 |
|---|---|---|---|---|---|
| Core diameter (mm) | 38.1 | 38.1 | 38.1 | 38.1 | 38.1 |
| Mid layer | | | | | |
| Tm (mm) | 1.00 | 1.00 | 1.00 | 1.00 | 1.00 |
| Hm (Shore D) | 35 | 35 | 35 | 35 | 35 |
| Cover | | | | | |
| Composition | C1 | C4 | C3 | C2 | C5 |
| Tc (mm) | 1.30 | 1.30 | 1.30 | 1.30 | 1.30 |
| Hc (Shore D) | 55 | 47 | 50 | 53 | 61 |
| Paint (inner layer) | | | | | |
| Composition | P7 | P4 | P4 | P4 | P4 |
| Mi (kgf/cm$^2$) | 8.2 | 186.4 | 186.4 | 186.4 | 186.4 |
| Ti (μm) | 10 | 10 | 10 | 10 | 10 |
| Paint (outer layer) | | | | | |
| Composition | P7 | P6 | P6 | P6 | P6 |
| Mo (kgf/cm$^2$) | 8.2 | 75.0 | 75.0 | 75.0 | 75.0 |
| To (μm) | 10 | 10 | 10 | 10 | 10 |
| Mi − Mo (kgf/cm$^2$) | 0 | 111.4 | 111.4 | 111.4 | 111.4 |
| Ti + To (μm) | 20 | 20 | 20 | 20 | 20 |
| W#1 ball speed (m/s) | 58.60 | 58.20 | 58.35 | 58.50 | 58.90 |
| W#1 launch angle (deg) | 13.5 | 13.3 | 13.4 | 13.5 | 13.6 |
| W#1 Spin ratio (rpm) | 2750 | 2910 | 2850 | 2790 | 2630 |
| W#1 distance (yd) | 200 | 196 | 198 | 200 | 202 |
| SW spin rate | | | | | |
| Dry Rd (rpm) | 4330 | 4650 | 4570 | 4500 | 4300 |
| Wet Rw (rpm) | 1310 | 2360 | 2300 | 2240 | 2080 |
| ratio (Rw/Rd) | 0.30 | 0.51 | 0.50 | 0.50 | 0.48 |
| Feel at impact | A | A | B | B | B |

TABLE 8

Results of Evaluation

| | Ex. 11 | Comp. Ex. 6 | Comp. Ex. 7 | Ex. 12 | Ex. 13 |
|---|---|---|---|---|---|
| Core diameter (mm) | 38.1 | 38.1 | 39.7 | 39.1 | 37.1 |
| Mid layer | | | | | |
| Tm (mm) | 1.00 | 1.00 | 1.00 | 1.00 | 1.00 |
| Hm (Shore D) | 35 | 35 | 35 | 35 | 35 |
| Cover | | | | | |
| Composition | C6 | C7 | C1 | C1 | C1 |
| Tc (mm) | 1.30 | 1.30 | 0.50 | 0.80 | 1.80 |
| Hc (Shore D) | 65 | 70 | 55 | 55 | 55 |
| Paint (inner layer) | | | | | |
| Composition | P4 | P4 | P4 | P4 | P4 |
| Mi (kgf/cm$^2$) | 186.4 | 186.4 | 186.4 | 186.4 | 186.4 |
| Ti (μm) | 10 | 10 | 10 | 10 | 10 |
| Paint (outer layer) | | | | | |
| Composition | P6 | P6 | P6 | P6 | P6 |
| Mo (kgf/cm$^2$) | 75.0 | 75.0 | 75.0 | 75.0 | 75.0 |
| To (μm) | 10 | 10 | 10 | 10 | 10 |
| Mi − Mo (kgf/cm$^2$) | 111.4 | 111.4 | 111.4 | 111.4 | 111.4 |
| Ti + To (μm) | 20 | 20 | 20 | 20 | 20 |
| W#1 ball speed (m/s) | 59.05 | 59.20 | 58.44 | 58.50 | 58.70 |
| W#1 launch angle (deg) | 13.7 | 13.8 | 13.7 | 13.6 | 13.4 |
| W#1 Spin ratio (rpm) | 2550 | 2450 | 2590 | 2650 | 2850 |
| W#1 distance (yd) | 203 | 204 | 201 | 201 | 199 |
| SW spin rate | | | | | |
| Dry Rd (rpm) | 4200 | 4075 | 4350 | 4390 | 4510 |
| Wet Rw (rpm) | 2000 | 1900 | 2040 | 2100 | 2300 |
| ratio (Rw/Rd) | 0.48 | 0.47 | 0.47 | 0.48 | 0.51 |
| Feel at impact | B | C | A | B | B |

TABLE 9

Results of Evaluation

| | Comp. Ex. 8 | Ex. 14 | Ex. 15 |
|---|---|---|---|
| Core diameter (mm) | 36.7 | 39.1 | 40.7 |
| Mid layer | | | |
| Tm (mm) | 1.00 | — | — |
| Hm (Shore D) | 35 | — | — |
| Cover | | | |
| Composition | C1 | C1 | C1 |
| Tc (mm) | 2.00 | 1.80 | 1.00 |
| Hc (Shore D) | 55 | 55 | 55 |
| Paint (inner layer) | | | |
| Composition | P4 | P4 | P4 |
| Mi (kgf/cm$^2$) | 186.4 | 186.4 | 186.4 |
| Ti (μm) | 10 | 10 | 10 |
| Paint (outer layer) | | | |
| Composition | P6 | P6 | P6 |
| Mo (kgf/cm$^2$) | 75.0 | 75.0 | 75.0 |
| To (μm) | 10 | 10 | 10 |
| Mi − Mo (kgf/cm$^2$) | 111.4 | 111.4 | 111.4 |
| Ti + To (μm) | 20 | 20 | 20 |
| W#1 ball speed (m/s) | 58.74 | 58.70 | 58.54 |
| W#1 launch angle (deg) | 13.4 | 13.4 | 13.6 |
| W#1 Spin ratio (rpm) | 3100 | 3000 | 2840 |
| W#1 distance (yd) | 196 | 198 | 199 |
| SW spin rate | | | |
| Dry Rd (rpm) | 4520 | 4400 | 4480 |
| Wet Rw (rpm) | 2340 | 2130 | 2220 |

TABLE 9-continued

Results of Evaluation

|  | Comp. Ex. 8 | Ex. 14 | Ex. 15 |
|---|---|---|---|
| ratio (Rw/Rd) | 0.52 | 0.48 | 0.50 |
| Feel at impact | C | B | B |

As shown in Tables 5 to 9, the golf ball of each Example is excellent in spin performance in a dry state and in a wet state and is also excellent in flight performance. From the results of evaluation, advantages of the present invention are clear.

The golf ball according to the present invention is suitable for, for example, playing golf on golf courses and practicing at driving ranges. The above descriptions are merely illustrative examples, and various modifications can be made without departing from the principles of the present invention.

What is claimed is:

1. A golf ball comprising a core, a cover positioned outside the core, and a paint film positioned outside the cover, wherein the paint film includes an inner layer and an outer layer positioned outside the inner layer, a 10% modulus Mo of the outer layer is lower than a 10% modulus Mi of the inner layer, a difference (Mi-Mo) between the modulus Mi and the modulus Mo is not less than 25.0 kgf/cm$^2$, the cover has a Shore D hardness Hc of not less than 50 and not greater than 65, and the cover has a thickness Tc of not less than 0.80 mm and not greater than 1.80 mm.

2. The golf ball according to claim 1, wherein the modulus Mi is not less than 100.0 kgf/cm$^2$.

3. The golf ball according to claim 1, wherein the modulus Mo is less than 100.0 kgf/cm$^2$.

4. The golf ball according to claim 1, wherein the inner layer has a thickness Ti of not less than 5 μm and not greater than 30 μm, and the outer layer has a thickness To of not less than 5 μm and not greater than 30 μm.

5. The golf ball according to claim 1, further comprising a mid layer between the core and the cover.

6. The golf ball according to claim 1, wherein the inner layer is formed from a resin composition, and a base resin of the resin composition is a polyurethane.

7. The golf ball according to claim 1, wherein the outer layer is formed from a resin composition, and a base resin of the resin composition is a polyurethane.

8. The golf ball according to claim 1, wherein the cover is formed from a resin composition, and a principal component of a base resin of the resin composition is an ionomer resin.

* * * * *